US011588229B2

(12) United States Patent
Kuroba et al.

(10) Patent No.: US 11,588,229 B2
(45) Date of Patent: Feb. 21, 2023

(54) STRADDLE TYPE VEHICLE

(71) Applicant: HONDA MOTOR CO., LTD., Tokyo (JP)

(72) Inventors: Yoshiyuki Kuroba, Wako (JP); Kazuyuki Maruyama, Wako (JP); Hiroshi Maeda, Wako (JP); Futoshi Koga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/198,646

(22) Filed: Mar. 11, 2021

(65) Prior Publication Data

US 2021/0203063 A1 Jul. 1, 2021

Related U.S. Application Data

(63) Continuation of application No. PCT/JP2019/032060, filed on Aug. 15, 2019.

(30) Foreign Application Priority Data

Sep. 28, 2018 (JP) .............................. JP2018-184937

(51) Int. Cl.
*H01Q 1/32* (2006.01)
*B62J 6/026* (2020.01)
(Continued)

(52) U.S. Cl.
CPC .............. *H01Q 1/325* (2013.01); *B62J 6/026* (2020.02); *B62J 99/00* (2013.01); *B62J 45/40* (2020.02)

(58) Field of Classification Search
CPC ....... H01Q 1/325; H01Q 1/3291; B62J 45/40; B62J 45/41; B62J 45/42; B62J 50/225
See application file for complete search history.

(56) References Cited

U.S. PATENT DOCUMENTS 6,483,467 B2   11/2002   Kushida et al.
6,778,143 B2   8/2004    Morita
(Continued)

FOREIGN PATENT DOCUMENTS

CN   1196440 A   10/1998
CN   1316363 A   10/2001
(Continued)

OTHER PUBLICATIONS

Ducati's "2025 Safety Road Map" Includes Introduction of Front and Rear Radar Systems by 2020, Roadracing World Publishing, Inc. [online], Apr. 18, 2018, <https://www.roadracingworld.com/news/ducatis-2025-safety-road-map-includes-introduction-of-front-and-rear-radar-systems-by-2020>, accessed Sep. 17, 2019.

(Continued)

*Primary Examiner* — Daniel Munoz
(74) *Attorney, Agent, or Firm* — Thomas Horstemeyer, LLP

(57) ABSTRACT

A straddle type vehicle comprises a front antenna configured to be capable of transmitting/receiving a wireless signal of a predetermined frequency band and arranged closer to a front side than a seating portion on which a rider can sit, and a rear antenna configured to be capable of transmitting/receiving a wireless signal of a predetermined frequency band and arranged closer to a rear side than the seating portion, the front antenna has directivity in the front side of the straddle type vehicle.

7 Claims, 5 Drawing Sheets

(51) Int. Cl.
  *B62J 99/00* (2020.01)
  *B62J 45/40* (2020.01)

(56) References Cited

U.S. PATENT DOCUMENTS

| | | | |
|---|---|---|---|
| 7,187,270 B2 | 3/2007 | Kushida et al. | |
| 7,362,278 B2 | 4/2008 | Funayose | |
| 9,242,599 B2 | 1/2016 | Shimizu et al. | |
| 9,663,170 B2 | 5/2017 | Kunisada et al. | |
| 9,893,415 B2 | 2/2018 | Hashimoto | |
| 9,947,146 B2 | 4/2018 | Maeda et al. | |
| 10,742,933 B2 | 8/2020 | Noguchi et al. | |
| 2002/0003501 A1* | 1/2002 | Kushida | H01Q 1/3291 343/721 |
| 2002/0120399 A1 | 8/2002 | Morita | |
| 2004/0135679 A1 | 7/2004 | Kushida et al. | |
| 2007/0247377 A1 | 10/2007 | Funayose | |
| 2014/0015656 A1 | 1/2014 | Shimizu et al. | |
| 2016/0013545 A1* | 1/2016 | Hashimoto | H01Q 1/325 343/713 |
| 2016/0068215 A1 | 3/2016 | Kunisada et al. | |
| 2016/0241816 A1 | 8/2016 | Noguchi et al. | |
| 2016/0321845 A1 | 11/2016 | Maeda et al. | |
| 2017/0179583 A1 | 6/2017 | Hashimoto | |
| 2017/0225619 A1 | 8/2017 | Torii et al. | |
| 2021/0175614 A1 | 6/2021 | Hashimoto et al. | |

FOREIGN PATENT DOCUMENTS

| | | |
|---|---|---|
| CN | 1372146 A | 10/2002 |
| CN | 1504359 A | 6/2004 |
| CN | 1769922 A | 5/2006 |
| CN | 101202373 A | 6/2008 |
| CN | 102167107 A | 8/2011 |
| CN | 103402860 A | 11/2013 |
| CN | 105228890 A | 1/2016 |
| CN | 105873798 A | 8/2016 |
| CN | 106945755 A | 7/2017 |
| CN | 107074316 A | 8/2017 |
| EP | 1143259 A2 | 10/2001 |
| EP | 1905682 A1 | 4/2008 |
| EP | 2965979 A1 | 1/2016 |
| EP | 3053818 A1 | 8/2016 |
| JP | 2001352209 A | 12/2001 |
| JP | 2002140800 A | 5/2002 |
| JP | 2006102387 A | 4/2006 |
| JP | 2011178243 A | 9/2011 |
| WO | 2014/136658 A1 | 9/2014 |
| WO | 2015/049792 A1 | 4/2015 |
| WO | 2016/035797 A1 | 3/2016 |
| WO | 2020/045252 A1 | 3/2020 |
| WO | 2020066352 A1 | 4/2020 |

OTHER PUBLICATIONS

International Search Report for PCT/JP2019/032060 dated Nov. 5, 2019.
Extended European Search Report for European Patent Application No. 19867607.4 dated Oct. 5, 2021.
Chinese Office Action for Chinese Patent Application No. 201980060801.8 dated Oct. 20, 2021 (partially translated).

* cited by examiner

STRADDLE TYPE VEHICLE

CROSS-REFERENCE TO RELATED APPLICATION(S)

This application is a continuation of International Patent Application No. PCT/JP2019/032060 filed on Aug. 15, 2019, which claims priority to and the benefit of Japanese Patent Application No. 2018-184937 filed on Sep. 28, 2018, the entire disclosures of which are incorporated herein by reference.

BACKGROUND OF THE INVENTION

Field of the Invention

The present invention relates to a straddle type vehicle that has a communication function.

Description of the Related Art

PTL 1 discloses a straddle type vehicle that is provided with communication antennas in which an omnidirectional antenna is used to form an antenna arranged at the front of a vehicle and a rear directional antenna is used to form an antenna at the rear of the vehicle, and obtains information about the periphery of the vehicle by road-to-vehicle communication and vehicle-to-vehicle communication.

CITATION LIST

Patent Literature

PTL 1: International Publication No. 2014/136658

SUMMARY OF THE INVENTION

Technical Problem

However, in the communication performed in Cooperative Intelligent Transport Systems (C-ITS), an antenna that has directivity in the front side of the vehicle needs to be arranged to ensure a far-reaching communication range in the direction of travel of the vehicle.

In consideration of the above problem, the present invention provides a straddle type vehicle in which a far-reaching communication range can be ensured with respect to the front side of the vehicle.

Solution to Problem

A straddle type vehicle according to a first aspect of the present invention is a straddle type vehicle that comprises a front antenna configured to be capable of transmitting/receiving a wireless signal of predetermined frequency band and arranged closer to a front side than a seating portion on which a rider can sit, and a rear antenna configured to be capable of transmitting/receiving a wireless signal of predetermined frequency band and arranged closer to a rear side than the seating portion, the straddle type vehicle further comprising:
a headlight unit configured to emit light toward the front side; and
a meter unit,
wherein the front antenna has directivity in the front side of the straddle type vehicle, wherein the front antenna is arranged at a position closer to a lower side than an upper end of the meter unit and is arranged at a position closer to an upper side than a lower end of the headlight unit, and wherein the front antenna is shaped like a flat plate and is arranged along a surface on a vehicle rear side of a front panel which forms a front cover of the straddle type vehicle in a side view of the straddle type vehicle.

According to a second aspect of the present invention, there is provided the straddle type vehicle, wherein the front antenna is supported by the front panel via an antenna support stay arranged on the front panel.

According to a third aspect of the present invention, there is provided the straddle type vehicle, further comprising:
a plate support stay arranged at a lower end portion of a cowl member configured to form the front cover of the straddle type vehicle;
a plate attachment portion formed on a front end portion of the plate support stay; and
a license plate attached to the plate attachment portion,
wherein the front antenna is arranged at a position closer to the upper side than the license plate.

According to a fourth aspect of the present invention, there is provided the straddle type vehicle, wherein the antenna support stay supports the front antenna in a state in which the front antenna is spaced apart from the front panel with a gap arranged between the front panel and the front antenna.

According to a fifth aspect of the present invention, there is provided the straddle type vehicle, wherein the front antenna is positioned closer to the front side than a rear end of the headlight unit of the straddle type vehicle in a longitudinal direction of the vehicle.

According to a sixth aspect of the present invention, there is provided the straddle type vehicle, further comprising:
a detection unit configured to detect a state of the front side of the straddle type vehicle,
wherein the detecting unit is arranged closer to the front side and the lower side of the straddle type vehicle than the front antenna.

According to a seventh aspect of the present invention, there is provided the straddle type vehicle, further comprising:
a camera configured to capture the state of the front side of the straddle type vehicle,
wherein the camera is arranged between the detecting unit and the front antenna in a vertical direction of the vehicle.

According to an eighth aspect of the present invention, there is provided the straddle type vehicle, wherein the meter unit is arranged on a surface on a vehicle front side of a meter panel formed on the vehicle rear side with respect to the front panel via an upper panel which is positioned above the meter unit, and the front antenna is arranged on the front side of the meter unit in a side view of the straddle type vehicle.

Advantageous Effects of Invention

According to the straddle type vehicle of the first aspect, a straddle type vehicle that can ensure a far-reaching communication range from the front side of the vehicle can be provided.

According to the straddle type vehicle of the first aspect, a waterproof state and a dustproof state can be ensured while avoiding interference with a suspension. Also, since a metallic obstacle is not present on the front side and the upper side of the front antenna, the radiation of electromagnetic waves with forward directivity will not be influenced, and a favorable directivity can be ensured in the front side of the straddle type vehicle.

According to the straddle type vehicle of the first aspect, the front antenna can be arranged so as not to be visible from the outside, thereby improving the outer appearance of the straddle type vehicle. In addition, by arranging the front antenna along the surface on the vehicle rear side of the front panel, a space for installing peripheral members (for example, a driving unit DR and an electronic control unit ECU) can be ensured between the front panel forming the front cover and the meter unit of the front portion of the straddle type vehicle, and the layout of the peripheral members can be improved.

In addition, since arranging the front antenna, which has forward directivity, along the surface on the vehicle rear side of the front panel will make it difficult for peripheral members, such as the headlight unit, the meter unit, metallic main frames, and the like, to interfere with the radio waves, a favorable communication environment can be obtained without receiving the influence of a metallic shielding object, in the upper side and the front side of the front antenna.

According to the straddle type vehicle of the second aspect, the front antenna can be reliably supported with respect to the front panel by using an antenna support stay as a support, thus ensuring the emission accuracy of the front antenna.

According to the straddle type vehicle of the third aspect, by arranging the front antenna at a position closer to the upper side than the license plate, a favorable communication environment can be obtained without receiving the influence of a metallic shielding object.

According to the straddle type vehicle of the fourth aspect, by supporting the front antenna so as to be spaced apart from the front panel, the vibration of the straddle type vehicle will hardly be propagated to the front antenna via the front panel. As a result, it will be possible to prevent the front antenna from shifting from the attachment position and prevent the position of the emission surface of the electromagnetic waves from changing.

According to the straddle type vehicle of the fifth aspect, since the front antenna is positioned closer to the front side than the rear end of the headlight unit in the longitudinal direction of the vehicle, it will be possible to suppress the generation of electrical interference between metal components, such as reflectors which have undergone the metal plating process, which are present in the headlight unit.

According to the straddle type vehicle of the sixth aspect, by arranging the front antenna and the detection unit to be spaced apart from each other in a relative positional relationship in the longitudinal direction of the vehicle and in the vertical direction of the vehicle, the mutual interference of electromagnetic waves can be suppressed, and the communication performance of the front antenna and the detection performance of the detecting unit can be ensured.

According to the straddle type vehicle of the seventh aspect, by arranging the camera and the detecting unit below the front antenna in the vertical direction of the vehicle, it will be possible to ensure that a metallic shielding object that can shield the electromagnetic waves will not be arranged on the front side and the upper side of the front antenna. Since a metallic obstacle will not be present on the front side and the upper side of the front antenna, the radiation of the electromagnetic waves with forward directivity will not be influenced, and a favorable directivity can be ensured in the front side of the straddle type vehicle.

According to the straddle type vehicle of the eighth aspect, assembly work can be improved by attaching the front antenna and the meter unit to the front panel and the meter panel, respectively, in advance so as to have these components in an assembled state.

Further features of the present invention will become apparent from the following description of exemplary embodiments (with reference to the attached drawings).

DESCRIPTION OF THE EMBODIMENTS

An embodiment of the present invention will be described below with reference to the accompanying drawings. Components described in this embodiment are merely examples and are not limited by the following embodiment. In each drawing, arrows X, Y, and Z indicate directions perpendicular to each other. The X direction indicates the front-and-rear direction of a motorcycle (straddle type vehicle), the Y direction indicates the vehicle width direction (left-and-right direction) of the straddle type vehicle, and the Z direction indicates the vertical direction. The left and right of the straddle type vehicle are the left and right in the traveling direction. The front or rear in the front-and-rear direction of the straddle type vehicle will simply be called the front or rear in some cases. Also, the inside or outside in the vehicle width direction (left-and-right direction) of the straddle type vehicle will simply be called the inside or outside in some cases.

<Outline of Straddle Type Vehicle>

Figure 1:
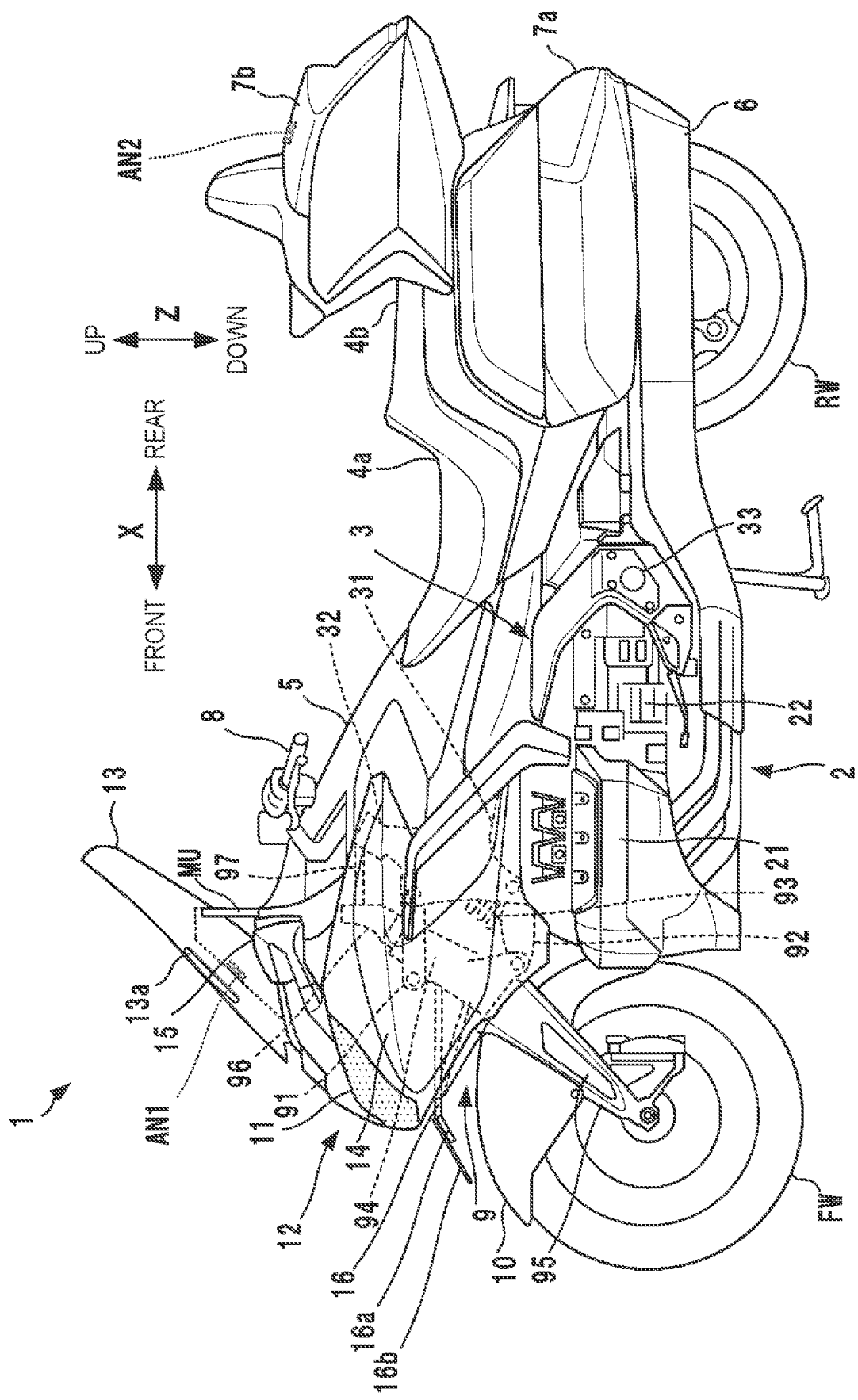
FIG. 1 is a side view of the left side of a straddle type vehicle according to an embodiment of the present invention.
Figure 2:
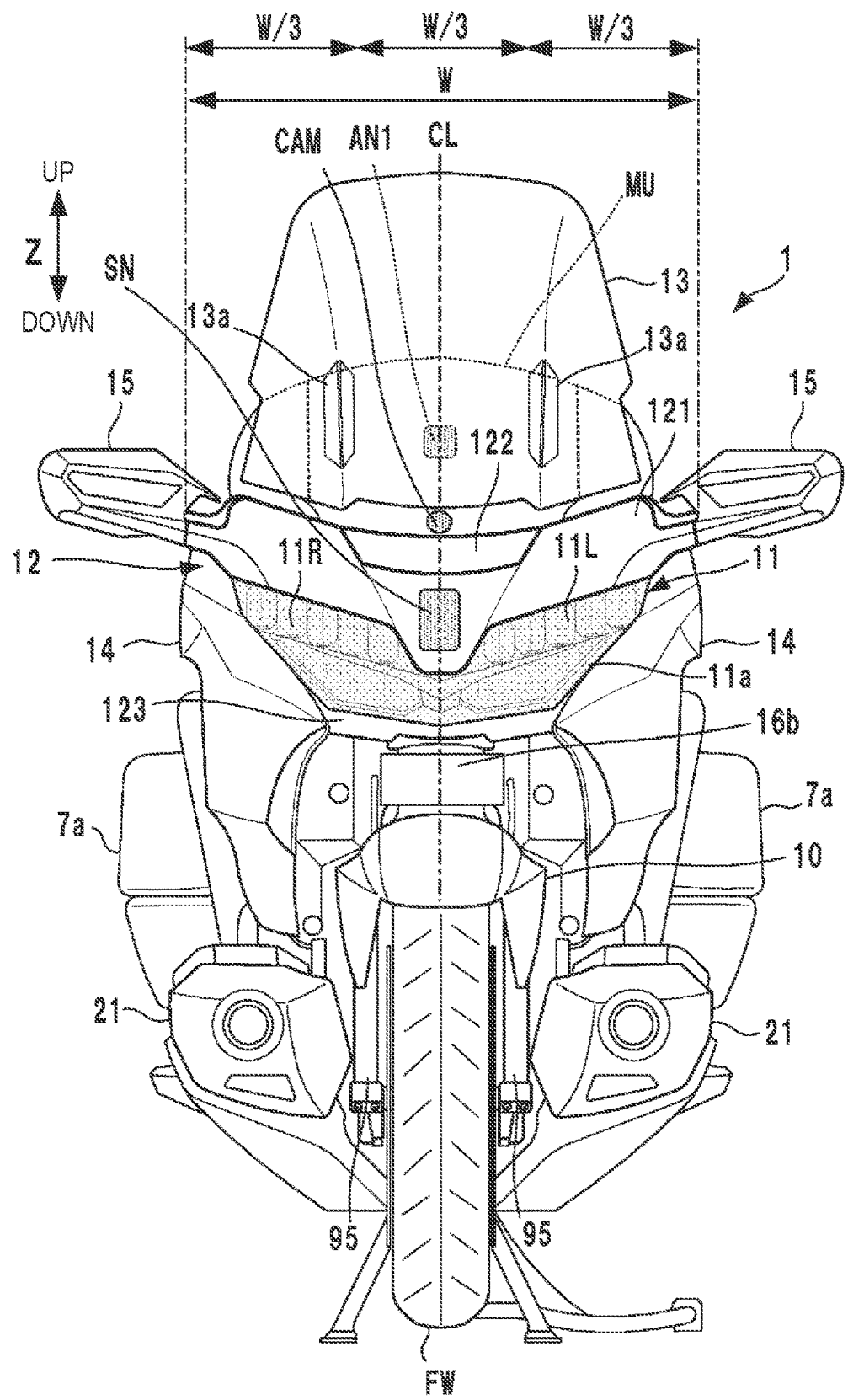
FIG. 2 is a front view of the straddle type vehicle of FIG. 1.

FIG. 1 is a side view of the left side of a straddle type vehicle 1 according to the embodiment of the present invention. FIG. 2 is a front view of the straddle type vehicle 1. The straddle type vehicle 1 is a touring motorcycle suitable for long-distance travel. However, the present invention is applicable to various kinds of straddle type vehicles including motorcycles of other forms. The present invention is also applicable to a vehicle including an internal-combustion engine as a driving source, and an electric vehicle including a motor as a driving source. In the following description, the straddle type vehicle 1 will sometimes be called the vehicle 1.

The vehicle 1 includes a power unit 2 between a front wheel FW and a rear wheel RW. In this embodiment, the power unit 2 includes a flat-six engine 21 and a transmission 22. The driving force of the transmission 22 is transmitted to the rear wheel RW via a drive shaft (not shown) and rotates the rear wheel RW.

The power unit 2 is supported by a vehicle body frame 3. The vehicle body frame 3 includes a pair of left and right main frames 31 extending in the X direction. A fuel tank 5 and an air cleaner box (not shown) are arranged above the main frames 31. A meter unit MU for displaying various kinds of information to the rider is installed before the fuel tank 5.

A head pipe 32 for pivotally supporting a steerable shaft (not shown) that is pivoted by a handlebar 8 is attached to the front end portions of the main frames 31. A pair of left and right pivot plates 33 are attached to the rear end portions of the main frames 31. The lower end portions of the pivot plates 33 and the front end portions of the main frames 31 are connected by a pair of left and right lower arms (not shown), and the power unit 2 is supported by the main frames 31 and the lower arms. In addition, a pair of left and right seat rails which are extending backward are formed in the rear end portions of the main frames 31, and support, for example, a seat 4a on which the rider sits, a seat 4b on which a fellow passenger sits, and a rear trunk 7b.

The front end portion of a rear swing arm (not shown) extending in the front-and-rear direction is swingably supported by the pivot plates 33. The rear swing arm is vertically swingable, and its rear end portion supports the rear wheel RW. An exhaust muffler 6 for silencing the exhaust gas of the engine 21 extends in the X direction in the lower side portion of the rear wheel RW. Left and right saddlebags 7a are formed on the upper side portions of the rear wheel RW.

A front suspension mechanism 9 for supporting the front wheel FW is formed in the front end portions of the main frames 31. The front suspension mechanism 9 includes an upper link 91, a lower link 92, a fork support member 93, a cushion unit 94, and a pair of left and right front forks 95. In the front suspension mechanism 9, the upper link 91, the lower link 92, the fork support member 93, and the cushion unit 94 form a support mechanism for supporting the front forks 95 of the vehicle 1.

The upper link 91 and the lower link 92 are arranged to be vertically spaced apart from each other in the front end portions of the main frames 31. The rear end portions of the upper link 91 and the lower link 92 are swingably connected to the front end portions of the main frames 31. The upper link 91 and the lower link 92 are swingably connected to the fork support member 93. The cushion unit 94 has a structure in which a shock absorber is inserted into a coil spring, and its upper end portion is swingably supported by the main frames 31. The lower end portion of the cushion unit 94 is swingably supported by the lower link 92.

The fork support member 93 is cylindrical and inclines backward. The fork support member 93 supports a steering shaft 96 so that it is rotatable around its axis. The steering shaft 96 has a shaft portion (not shown) inserted into the fork support member 93. A bridge (not shown) is formed in the lower end portion of the steering shaft 96, and supports the pair of left and right front forks 95. The front forks 95 rotatably support the front wheel FW. The upper end portion of the steering shaft 96 is connected to the steerable shaft (not shown) that is pivoted by the handlebar 8, via a link 97. When the handlebar 8 is steered, the steering shaft 96 rotates and steers the front wheel FW. The upper portion of the front wheel FW is covered with a fender 10, and the fender 10 is supported by the front forks 95.

<Front Structure>

Figure 3:
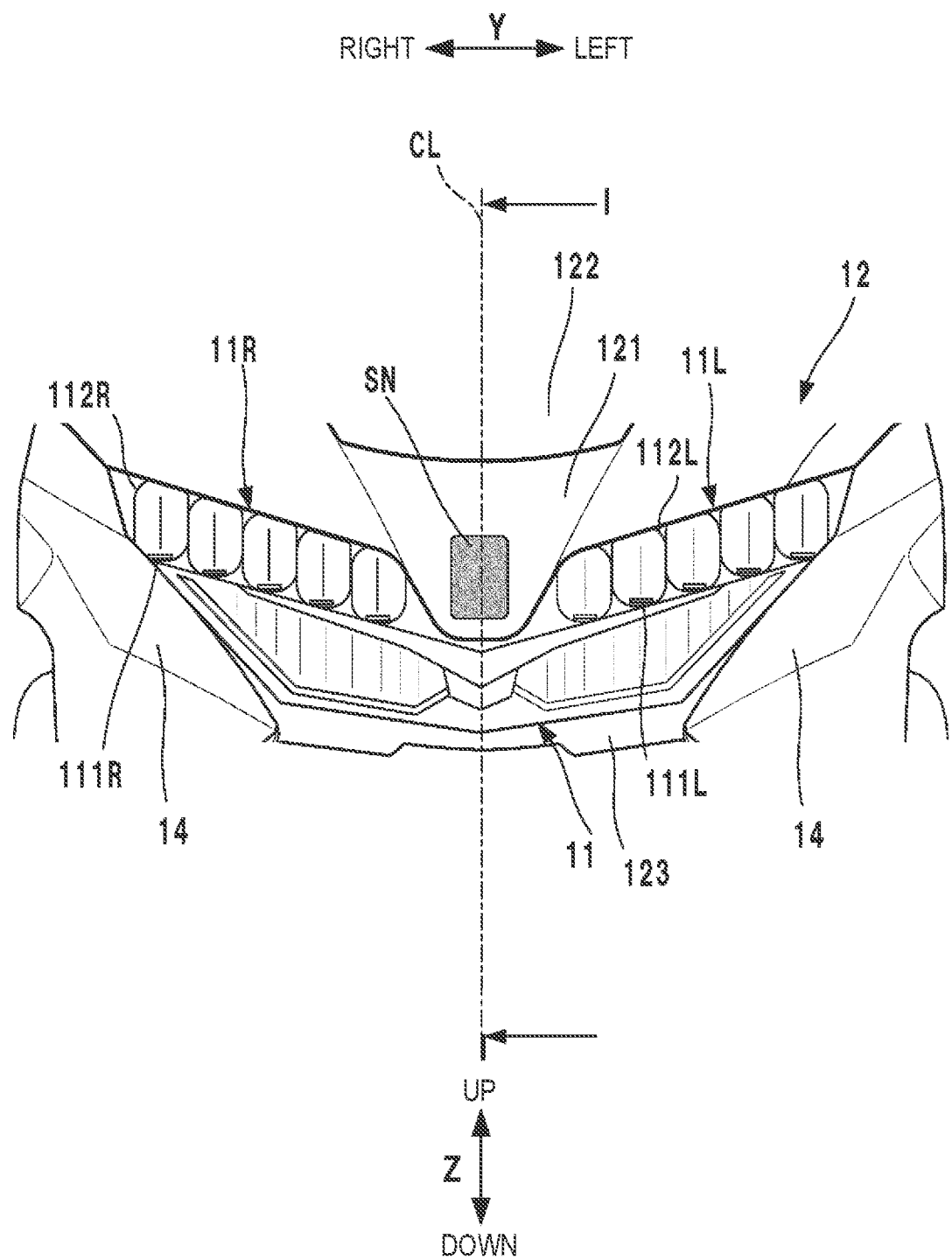
FIG. 3 is an enlarged view of the periphery of a headlight unit.
Figure 4:
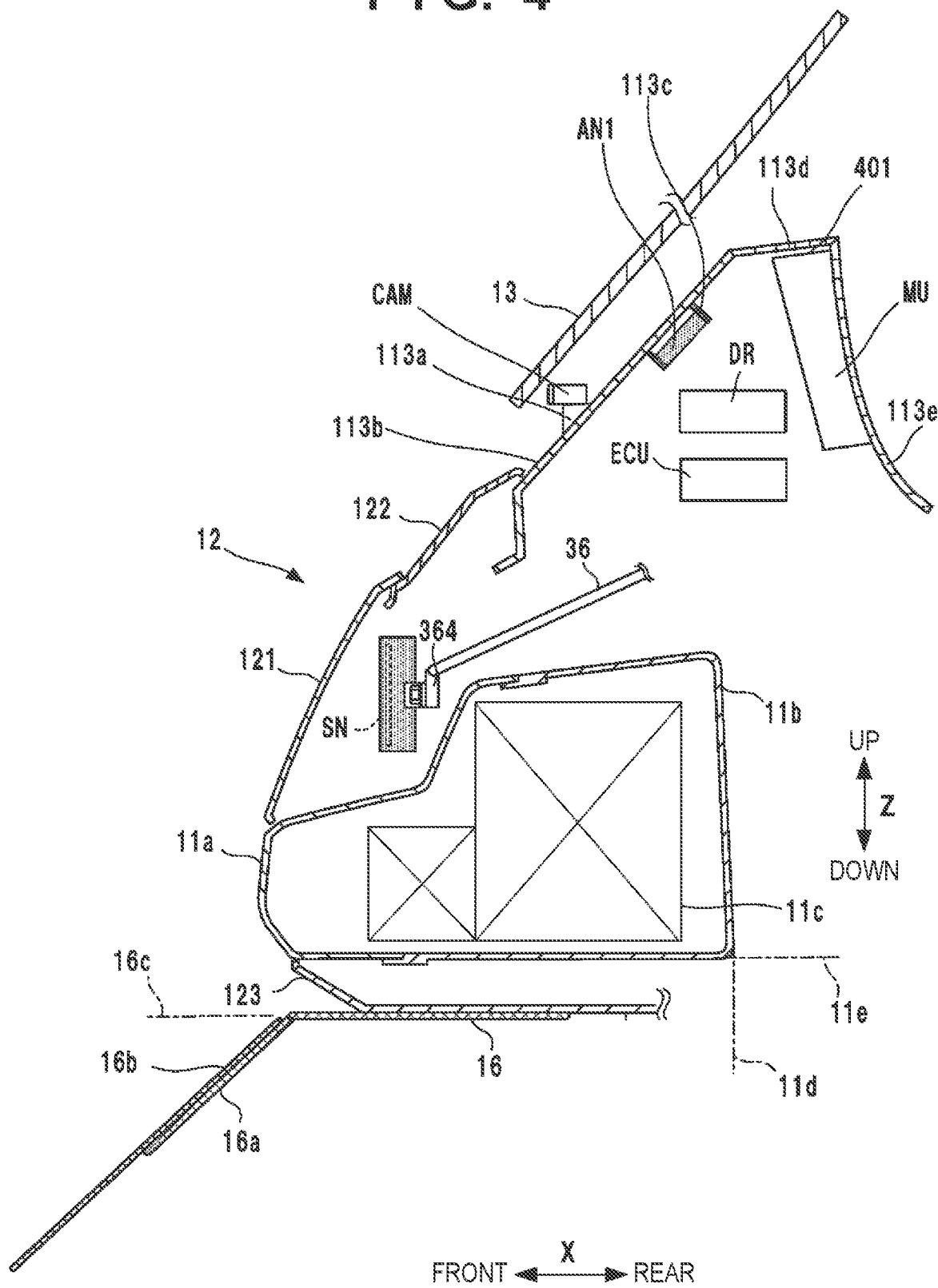
FIG. 4 is a schematic sectional view of a front structure of the straddle type vehicle.

The front structure of the vehicle 1 will be explained with reference to FIGS. 1 to 5. FIG. 3 is an enlarged view of the periphery of the headlight unit 11 of the vehicle 1. FIG. 4 is a schematic sectional view of the front structure of the vehicle 1 taken along a center line CL. The headlight unit 11 for emitting light ahead of the vehicle 1 is arranged in the front portion of the vehicle 1. The headlight unit 11 of this embodiment is a two-lamp headlight unit that symmetrically includes a right-side light emitting unit 11R and a left-side light emitting unit 11L.

The light emitting unit 11R includes a plurality of pairs (five pairs in this example shown in the drawing) of light sources 111R and reflectors 112R. The light source 111R is a light emitting element such as an LED. The reflector 112R is formed to surround the light source 111R from behind the light source 111R, and reflects light emitted by the light source 111R ahead of the vehicle 1.

The light emitting unit 11L has the same arrangement as that of the light emitting unit 11R, and includes a plurality of pairs (five pairs in this example shown in the drawing) of light sources 111L and reflectors 112L. The light source 111L is a light emitting element such as an LED. The reflector 112L is formed to surround the light source 111L from behind the light source 111L, and reflects light emitted by the light source 111L ahead of the vehicle 1. The respective surfaces of the reflectors 112R and the reflectors 112L have undergone a metal plating process to increase the reflectance of light, and the respective light beams from the light sources 111R and the light source 111L are emitted to the front side of the vehicle 1 upon being reflected by the surfaces of the reflectors 112R and the reflectors 112L.

A lens portion 11a is arranged on the front surface of the headlight unit 11. The lens portion 11a is formed by a resin or the like that has transparency. The lens portion 11a of this embodiment is a member arranged so as to cover both the light emitting unit 11R and the light emitting unit 11L. The exterior of the headlight unit 11 is formed by the lens portion 11a and a housing 11b. An electric circuit 11c, which is schematically shown in FIG. 4, is arranged in the interior space of the headlight unit. The electric circuit 11c includes the reflectors 112R and 112L and the light sources 111R and 111L described above, their driving circuits, and the like.

The front portion of the vehicle 1 is covered by a front cover 12, and the side portions of the vehicle 1 on the front side are covered by a pair of left and right side covers 14. A screen 13 supported by screen stays 13a is arranged on the upper side of the front cover 12. The screen 13 is a windshield that reduces the wind pressure that the rider receives during travel, and is formed by, for example, a transparent resin member. A driving unit DR for driving the screen 13 and an electronic control unit ECU are arranged between a front panel 113b which forms the front cover 12 and the meter unit MU in the front portion of the vehicle 1. The driving unit DR includes a motor which serves as a driving source to raise and lower the screen 13 and an electric circuit which controls the motor.

In addition, a detecting unit SN for detecting the state ahead of the vehicle 1 and a camera CAM for capturing the state ahead of the vehicle 1 are arranged in the vehicle 1, and the electronic control unit ECU can perform driving support control and periphery information notification to the rider based on the information obtained by antennas AN1 and AN2 (to be described later), the detecting unit SN, and the camera CAM.

A pair of left and right side mirror units 15 are arranged on the side portions of the front cover 12. Side mirrors (not shown) used by the rider to view the rear side are supported by the side mirror units 15.

The front cover 12 includes cowl members 121, 122, and 123, and the cowl members 121, 122, and 123 form a front cowl. The cowl member 121 extends in the Y direction to form the main body of the front cover 12, and the cowl member 122 forms the upper portion of the cowl member 121. The cowl member 123 forms the lower portion of the cowl member 121, and the cowl member 123 is disposed apart downward from the cowl member 121.

An opening that exposes the headlight unit 11 is formed between the cowl member 121 and the cowl member 123 and between the pair of left and right side covers 14. The upper edge of the opening is defined by the cowl member 121, the lower edge is defined by the cowl member 123, and the left and right edges are defined by the side covers 14.

The vehicle 1 according to this embodiment includes a front antenna (to be also referred to as the antenna AN1 hereinafter), which is capable of transmitting/receiving wireless signals of a predetermined frequency band and is arranged closer to the front side than the seat portions (4a, 4b) where the rider can sit, and a rear antenna (to be also referred to as the antenna AN2 hereinafter), which is capable of transmitting/receiving wireless signals of a predetermined frequency band and is arranged closer to the rear side than the seat portions (4a, 4b).

Figure 5:
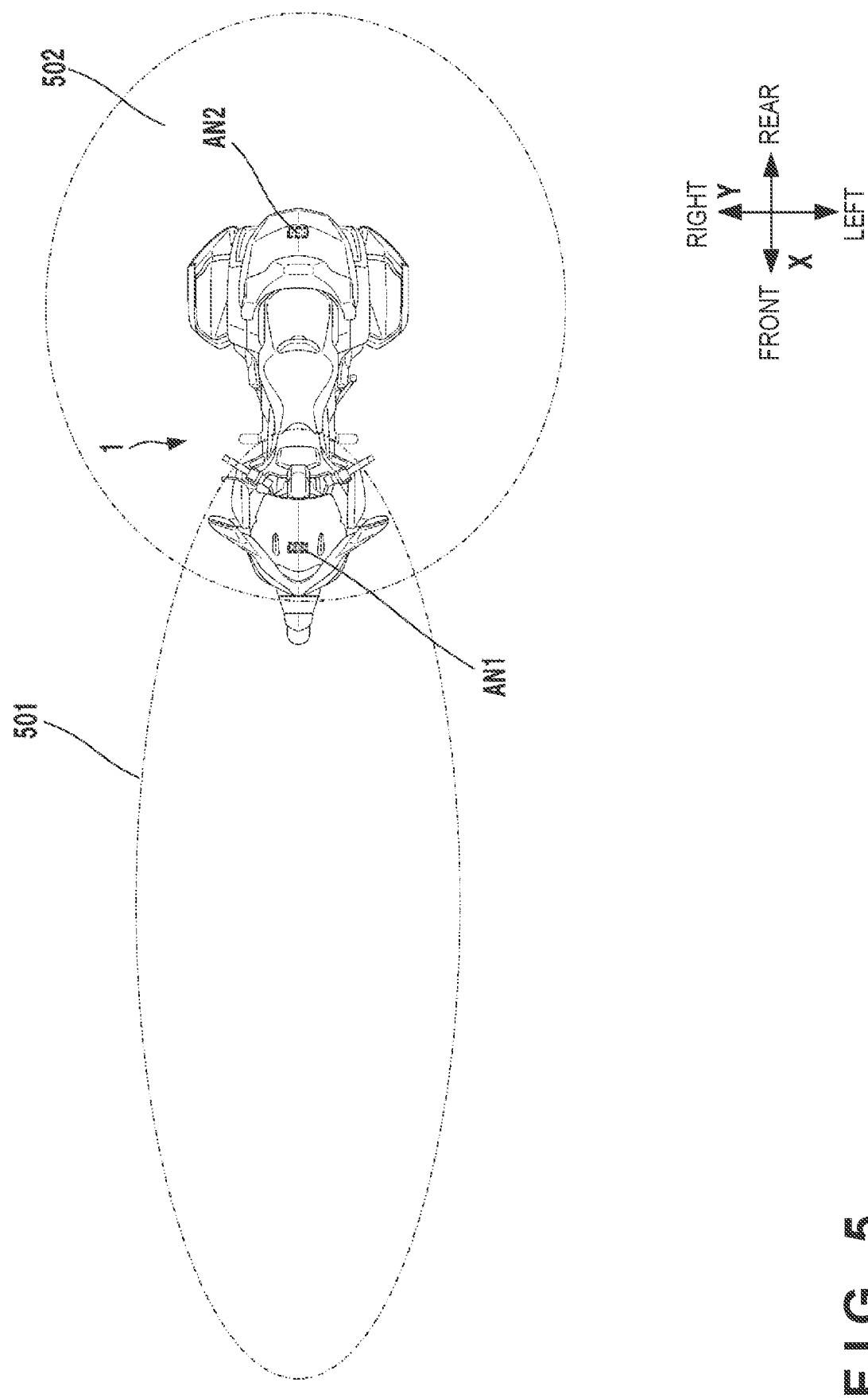
FIG. 5 is a view schematically showing a radiation pattern of electromagnetic waves of a front antenna and electromagnetic waves of a rear antenna in a planar view of the vehicle.

FIG. 5 is a view schematically showing the radiation patterns (directivities) of the electromagnetic waves of the antennas AN1 and AN2 in a planar view of the vehicle 1. The vehicle 1 that includes the antenna AN1 (front antenna) having forward directivity and the omnidirectional antenna AN2 (rear antenna) will have, for example, radiation patterns 501 and 502, respectively, of electromagnetic waves as shown by two-dot dashed lines in FIG. 5. In FIG. 5, the radiation pattern 501 schematically shows the radiation pattern of the antenna AN1, and the radiation pattern 502 schematically shows the radiation pattern of the antenna AN2. In this embodiment, since the road-to-vehicle communication or the vehicle-to-vehicle communication performed at the front side of the vehicle 1 requires a longer communication distance than in the vehicle-to-vehicle communication or the like performed with a rear vehicle, an antenna that has forward directivity is arranged as the antenna AN1 (front antenna).

The antenna AN1 functions as a communication unit that obtains external information by communication, and can obtain detection information of a preceding vehicle, an obstacle, or the like which is ahead of the vehicle 1 by obtaining traffic information by communication (road-to-vehicle communication) with a communication server apparatus C-ITS-SV on a network or by vehicle-to-vehicle communication with a preceding vehicle. The communication server apparatus C-ITS-SV can distribute road traffic information collected from infrastructure facilities arranged on the road.

The antenna AN1 (front antenna) that has directivity on the front side of the vehicle 1 can obtain, based on the road traffic information distributed from the communication server apparatus CV-ITS-SV, information related to the front side of the vehicle 1 such as the state of the road ahead of the vehicle 1, for example, the presence/absence of an obstacle or construction, the information related to an accident that has occurred, the information related to the weather, or the information of a preceding vehicle (for example, the relative distance between the preceding vehicle, the relative speed of the preceding vehicle, the brake operation information of the preceding vehicle, and the like). Even if the information is in a faraway location, the information can be obtained by executing communication using the antenna AN1 with forward directivity.

The antenna AN2 (rear antenna) can execute vehicle-to-vehicle communication with each vehicle positioned at the rear side or the lateral sides of the vehicle 1, and can obtain information of a vehicle that is approaching the vehicle 1 from the rear. Although the directivity of the antenna AN2 is not particularly restricted, the antenna AN2 can be formed by, for example, an omnidirectional antenna. The antenna AN2 can also be formed by an antenna that has directivity in the rear side of the vehicle. In the portions, of the range of the directivity of the antenna AN2, which overlap the range of the antenna AN1, the information of the antenna AN2 can be used auxiliary. The antenna AN2 (rear antenna) can be arranged at a position without a metallic shielding object that can shield the electromagnetic waves in the rear side and the upper side of the antenna AN2. The antenna AN2 can be attached to, for example, the inner side surface of the rear trunk 7b which is made of a resin or the like.

The antenna AN1 is arranged at a position, without a metallic shielding object that can shield the electromagnetic waves in the forward side and the upper side of the antenna AN1, so that the communication range of the electromagnetic waves with high forward directivity to the vehicle can be expanded as much as possible.

In FIGS. 1 to 4, the screen stays 13a supporting the screen 13, the front cover 12, and the front panel 113b forming a part of the front cover 12 are formed by a resin or the like. In this case, the antenna AN1 is arranged at a position on the lower side than an upper end 401 of the meter unit MU as shown in FIG. 4, and is arranged at a position on the upper side than a lower end 11e of the headlight unit 11. The meter unit MU is arranged, here, on a surface on the vehicle front side of a meter panel 113e, which is formed on the vehicle rear side with respect to the front panel 113b, via an upper panel 113d which is positioned on the upper side of the meter unit MU. The front antenna (antenna AN1) is arranged on the front side of the meter unit MU in a side view of the straddle type vehicle 1. The front panel 113b, the upper panel 113d, and the meter panel 113e can be formed by a resin or the like. The assembly work can be improved by attaching the antenna AN1 and the meter unit MU to the front panel 113b and the meter panel 113e, respectively, in advance so as to have these components in an assembled state.

Although there are issues related to waterproofing and dustproofing with respect to the upper side of the meter unit MU and installing the antenna below the headlight unit 11 while avoiding interference with the suspension can be difficult, the front antenna AN1 can be arranged at a position which is lower than the upper end 401 of the meter unit MU and is also above the lower end 11e of the headlight unit 11 to ensure a waterproof state and a dustproof state while avoiding interference with the suspension. Also, since no metallic obstacles will be present on the front side and the upper side of the antenna AN1, the radiation of the electromagnetic waves with forward directivity will not be influenced, and a favorable directivity can be ensured in the front side of the vehicle 1.

In addition, as shown in FIG. 4, since the antenna AN1 is positioned closer to the front side than a rear end 11d of the headlight unit 11 in the longitudinal direction (X direction) of the vehicle, it is possible to suppress the generation of electrical interference between metal components, such as the reflectors 112R and 112L which have undergone the metal plating process, which are present in the headlight unit 11.

The antenna AN1 is shaped like a flat plate, and are arranged along a surface (inner side surface) on the vehicle rear side of the front panel 113b which forms the front cover 12 of the vehicle 1. In this case, each of the housings storing the antenna AN1 can also be shaped like a flat plate, and each housing can be arranged along the surface (inner side surface) on the vehicle rear side of the front panel 113b.

By setting such an arrangement structure, the antenna AN1 can be arranged not to be visible from the outside, and the outer appearance of the vehicle 1 can be improved. In addition, by arranging the antenna AN1 along the surface (inner side surface) on the vehicle rear side of the front panel 113b, a space for installing peripheral members (for example, the driving unit DR and the electronic control unit ECU) can be ensured between the meter unit MU at the front portion of the vehicle 1 and the front panel 113b forming the front cover 12, and the layout of the peripheral members can be improved.

In addition, arranging the antenna AN1, which has forward directivity, along the surface (inner side surface) on the vehicle rear side of the front panel 113b (arranging near a cover surface) will make it difficult for the peripheral members, such as the headlight unit 11, the meter unit MU, the metallic main frames 31, and the like, to interfere with the radio waves, thereby allowing a favorable communication environment to be obtained without receiving the influence of a metallic shielding object, in the upper side and the front side of the antenna AN1.

Also, as shown in FIG. 4, the antenna AN1 is supported by the front panel 113b via an antenna support stay 113c arranged on the front panel 113b. The antenna support stay 113c may support the antenna AN1 in a state in which the antenna AN1 is in contact with the front panel 113b or in a state in which the antenna AN1 is spaced apart from the front panel 113b by arranging a predetermined gap between them.

FIG. 4 shows an example of a state in which the antenna is supported spaced apart from the front panel with a gap between them. By supporting the antenna AN1 so as to be spaced apart from the front panel 113b, the vibration of the vehicle 1 will hardly be propagated to the antenna AN1 via the front panel 113b. As a result, it will be possible to prevent the antenna AN1 from shifting from the attachment position and prevent the position of the emission surface of the electromagnetic waves from changing.

A resin or the like can be used as the material of the antenna support stay 113c so as not to hinder the emission of electromagnetic waves from the antenna AN1. For example, the antenna support stay 113c can be made of an elastic member such as rubber or the like that has a high vibration attenuation rate. The emission accuracy of the antenna AN1 can be ensured by using the antenna support stay 113c to reliably support the antenna AN1 with respect to the front panel 113b.

Also, as shown in FIG. 4, a plate support stay 16 which is arranged on the lower end portion of the cowl member 123 forming the front cover 12 of the vehicle 1, a plate attachment portion 16a which is formed on the front end portion of the plate support stay 16, and a license plate 16b which is attached to the plate attachment portion 16a are provided on the vehicle 1. In the vehicle 1 according to this embodiment, the antenna AN1 is arranged at a position closer to the upper side than an upper end portion 16c of the license plate 16b. Arranging the antenna AN1 at a position closer to the upper side than the license plate 16b will allow a favorable communication environment to be obtained without receiving the influence of a metallic shielding object.

In the vehicle 1 according to this embodiment, the detecting unit SN is, for example, a millimeter wave radar or a laser radar (a so-called LiDAR (Light Detection And Ranging)), emits radio waves, and receives radio waves that have been reflected by an obstacle or a vehicle in the periphery. As a result, a vehicle or the like that is ahead of the straddle type vehicle 1 can be detected, and a distance (relative distance) to the preceding vehicle or the like or the speed (relative speed) of the preceding vehicle or the like can be detected. The detecting unit SN has an arrangement in which a signal transmission/reception unit and other electric circuits (not shown) are stored in a box-shaped housing.

In this embodiment, the detecting unit SN is arranged to be closer to the front side and the lower side of the vehicle 1 than the antenna AN1. By arranging the detecting unit SN and the antenna AN1 to be spaced apart from each other in a relative positional relationship in the longitudinal direction of the vehicle and in the vertical direction of the vehicle, the mutual interference of electromagnetic waves can be suppressed, and the communication performance of an antenna AN1 and the detection performance of the detecting unit SN can be ensured.

The vehicle 1 includes the vehicle body frame 3 which includes the main frames 31 extending the longitudinal direction of the vehicle, and the detecting unit SN is fixed to an attachment portion 364 of a front end portion of a support stay 36 and is supported by the main frames 31 via the support stay 36. In this embodiment, since the main component of the front cover 12 is made of a resin material that can transmit electromagnetic waves, arranging the detecting unit SN at this position will allow a favorable detection environment to be obtained without receiving the influence of a metallic shielding object. In addition, as shown in FIG. 4, since the detecting unit SN is positioned closer to the front side in the X direction than the rear end 11d of the headlight unit 11, it is possible to avoid, in the detection range of the detecting unit SN, the generation of electrical interference between the metal components, such as the reflectors 112R and 112L that have undergone a metal plating process, which are present in the headlight unit 11.

Also, in the vehicle 1 according to this embodiment, the camera CAM that captures the state ahead of the vehicle 1 is, for example, a camera (image capturing apparatus) that includes a CCD image sensor or a CMOS image sensor, and the camera CAM is attached above (above the outer side surface of the front panel 113b) the front panel 113b forming the front cover 12 via an attachment member 113a. As shown in FIG. 4, the camera CAM is arranged between the meter unit MU and the screen 13 in an arrangement position in the X direction (the longitudinal direction of the vehicle). By arranging the camera CAM on the inner side of the screen 13, it will be possible to prevent the image capturing lens of the camera CAM from becoming dirty.

In addition, the camera CAM is arranged between the detecting unit SN and the antenna AN1 in the vertical direction (Z direction) of the vehicle 1. That is, by arranging the detecting unit SN and the camera CAM below the antenna AN1 (front antenna) in the vertical direction of the vehicle, it will be possible to ensure that a metallic shielding object that can shield the electromagnetic waves will not be arranged on the front side and the upper side of the antenna AN1. Since a metallic obstacle will not be present on the front side and the upper side of the antenna AN1, the radiation of the electromagnetic waves with forward directivity will not be influenced, and a favorable directivity can be ensured in the front side of the vehicle 1.

As shown in FIG. 2, the antenna AN1, the camera CAM, and the detecting unit SN are arranged at the center of the front cover 12 in the Y direction. By arranging the antenna AN1, the camera CAM, and the detecting unit SN at the center of the front cover 12 in the Y direction, there will be no imbalance in the lateral directions in the front side of the vehicle 1 in the direction of travel, and a wider range of information can be obtained.

As an arrangement as shown in FIG. 2, for example, in a case in which a width W of the front cover 12 is divided equally into thirds in the Y direction in FIG. 2, the antenna AN1, the camera CAM, and the detecting unit SN can be arranged so that the center of each of the antenna AN1 and the like in the Y direction will be positioned within the range of W/3 of the center. Particularly, in this embodiment, the antenna AN1, the camera CAM, and the detecting unit SN are arranged on the center line CL of the front cover 12 in the Y direction. In this embodiment, the center line CL is the center line of the vehicle 1 in the Y direction.

The straddle type vehicle 1 includes (FIG. 4) the electronic control unit (ECU) that includes a CPU and a memory, and the electronic control unit (ECU) can notify the rider of the information of the periphery and execute driving support control based on the information obtained by the antenna AN1, the camera CAM, and the detecting unit SN. As driving support control, the electronic control unit (ECU) can perform some of the driving operations such as accelerating, braking, and the like of the vehicle in place of the rider. Vehicle speed maintenance travel control (Adaptive Cruise Control (ACC)), lane maintenance travel control (Lane Keep Assist System (LKAS)), and the like are such examples. If an obstacle is detected ahead of the vehicle 1 based on the information of the antenna AN1, the camera CAM, and the detecting unit SN, a notification to raise the awareness of the rider can be displayed, for example, on the meter unit MU.

As described above, according to the embodiment of the present invention, a straddle type vehicle that can ensure a far-reaching communication range from the front side of the vehicle 1 can be provided.

The present invention is not limited to the above embodiments and various changes and modifications can be made within the spirit and scope of the present invention. Therefore, to apprise the public of the scope of the present invention, the following claims are made.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A straddle type vehicle that comprises a front antenna configured to be capable of transmitting/receiving a wireless signal of a predetermined frequency band and arranged closer to a front side than a seating portion on which a rider can sit, and
   a rear antenna configured to be capable of transmitting/receiving a wireless signal of the predetermined frequency band and arranged closer to a rear side than the seating portion,
   the front antenna is used for communicating in cooperative intelligent transport systems,
   the straddle type vehicle further comprising:
   a headlight unit configured to emit light toward the front side; and
   a meter unit,
   a detection unit configured to detect a state of the front side of the straddle type vehicle,
   wherein the front antenna has directivity in the front side of the straddle type vehicle,
   wherein the front antenna is arranged at a position closer to a lower side than an upper end of the meter unit and is arranged at a position closer to an upper side than a lower end of the headlight unit
   wherein the front antenna is shaped like a flat plate and is arranged along a surface on a vehicle rear side of a front panel which forms a front cover of the straddle type vehicle in a side view of the straddle type vehicle, and
   wherein the detecting unit is arranged closer to the front side and the lower side of the straddle type vehicle than the front antenna.

2. The straddle type vehicle according to claim 1, wherein the front antenna is supported by the front panel via an antenna support stay arranged on the front panel.

3. The straddle type vehicle according to claim 1, further comprising:
   a plate support stay arranged at a lower end portion of a cowl member configured to form the front cover of the straddle type vehicle;
   a plate attachment portion formed on a front end portion of the plate support stay; and
   a license plate attached to the plate attachment portion,
   wherein the front antenna is arranged at a position closer to the upper side than the license plate.

4. The straddle type vehicle according to claim 2, wherein the antenna support stay supports the front antenna in a state in which the front antenna is spaced apart from the front panel with a gap arranged between the front panel and the front antenna.

5. The straddle type vehicle according to claim 1, wherein the front antenna is positioned closer to the front side than a rear end of the headlight unit of the straddle type vehicle in a longitudinal direction of the vehicle.

6. The straddle type vehicle according to claim 1, further comprising:
   a camera configured to capture the state of the front side of the straddle type vehicle,
   wherein the camera is arranged between the detecting unit and the front antenna in a vertical direction of the vehicle.

7. The straddle type vehicle according to claim 1, wherein the meter unit is arranged on a surface on a vehicle front side of a meter panel formed on the vehicle rear side with respect to the front panel via an upper panel which is positioned above the meter unit, and
   the front antenna is arranged between the vehicle rear side of the front panel and the front side of the meter unit in a side view of the straddle type vehicle.

* * * * *